Patented Aug. 4, 1936

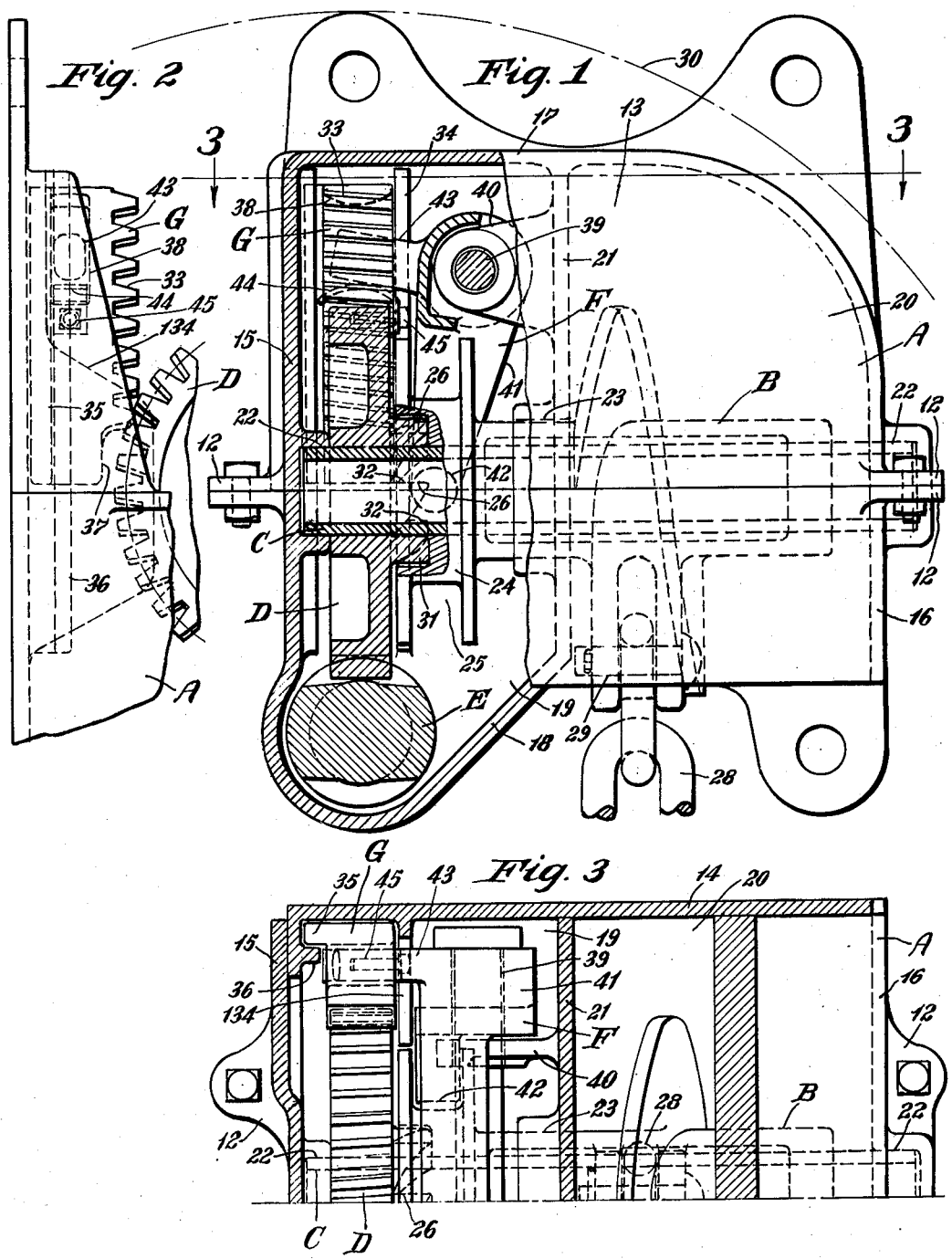

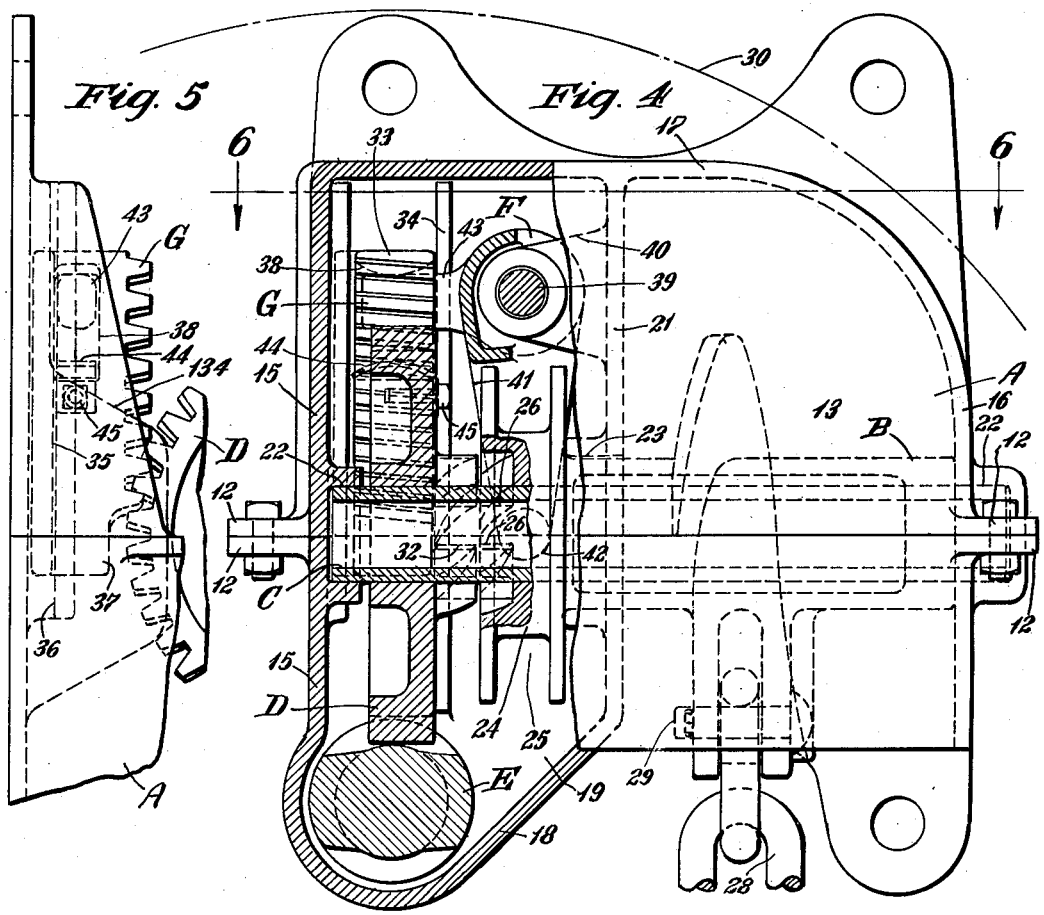

2,049,715

UNITED STATES PATENT OFFICE 2,049,715

HAND BRAKE

Roland J. Olander, Chicago, Ill., assignor to W. H. Miner, Inc., Chicago, Ill., a corporation of Delaware Application March 4, 1935, Serial No. 9,137

10 Claims. (Cl. 192—82)

This invention relates to improvements in hand brakes.

One object of the invention is to provide a power hand brake mechanism of the worm gear driven type wherein is embodied simple and efficient mechanism controlled by rotation of the usual hand wheel for disconnecting the brake chain winding element from the driving means after a predetermined backing off of the brakes, upon rotation of the hand wheel in brake releasing direction, and immediately operatively connecting the winding element to the driving means upon rotation of the hand wheel in brake applying direction.

A more specific object of the invention is to provide in a brake mechanism of the character specified in the preceding paragraph, clutch means operated directly by a sliding rack actuated by the worm gearing to operatively connect the winding element to and disconnect the same from the worm gearing.

Other objects of the invention will more clearly appear from the description and claims hereinafter following.

In the drawings forming a part of this specification, Figure 1 is a part front elevational and part vertical sectional view of a hand brake mechanism embodying my improvements. Figure 2 is an end elevational view, partly broken away, of the brake mechanism looking toward the right in Figure 1. Figure 3 is a horizontal sectional view, corresponding substantially to the line 3—3 of Figure 1, rearwardly of the center line of the rotary winding drum of said mechanism. Figures 4, 5, and 6 are views respectively similar to Figures 1, 2, and 3, but showing the operating mechanism in a different position.

In said drawings, my improved brake mechanism is shown as contained in a housing, Figures 1 and 4 illustrating the manner of positioning the housing when applied to the vertical end wall of a railway car.

My improved mechanism comprises broadly a housing A; a chain winding drum B; a hollow supporting shaft C on which the chain winding drum is rotatable and slidable; a worm wheel D rotatably mounted on the shaft C, the worm wheel and drum having cooperating clutch means thereon; a worm E meshing with the worm wheel; a shipper member F; and a sliding rack G engageable with the worm wheel and operatively connected to the shipper member.

The housing A comprises upper and lower sections secured together by bolts, or any other similar, well-known type of securing elements, extending through flanges 12—12 provided on said sections. The housing has spaced front and rear walls 13 and 14, spaced side walls 15 and 16, and top and bottom walls 17 and 18. The housing is divided into two compartments 19 and 20 by a partition wall 21, parallel to the side walls. The compartment 19, which is at the left hand side of the housing, as viewed in Figures 1 and 4, is extended below the compartment 20 to accommodate the worm element of the worm gearing.

The supporting shaft C, which is preferably in the form of a hollow cylindrical tube, extends from one side wall 15 to the side wall 16 and has its opposite ends supported in seats 22—22 provided in said side walls.

The chain winding drum B is rotatably mounted on the shaft C, and extends through a bearing opening 23 in the partition wall 21 into the compartment 19. The portion of the drum which extends into the compartment 19 is enlarged, as indicated at 24, said enlarged portion being provided with spaced annular flanges defining an annular guide groove 25 therebetween, with which the shipper member F cooperates. The enlarged section 24 is also provided with an annular set of inset clutch teeth 26 adapted to engage with cooperating clutch means on the worm wheel D. That portion of the drum B which is within the compartment 20 forms the chain winding portion thereof and is provided with a pair of laterally spaced lugs, between which the end link of the brake chain 28 is engaged, said end link being anchored to the lugs by a transverse bolt 29. The bottom of the housing chamber 20 is open to accommodate the chain and permit lateral displacement thereof during sliding movement of the drum on the shaft C and unwinding of the chain.

The worm wheel D is freely rotatable on the shaft C and is driven by the worm E, which is located below the wheel D and has its opposite ends journaled in suitable openings in the front and rear walls of the housing. The worm wheel is rotated by the usual manually operated hand wheel, which is fixed to the outer end of the worm, a portion of the hand wheel being indicated by the dot and dash line 30 in Figures 1 and 4.

At the right hand side, as viewed in Figures 1 and 4, the worm wheel D is provided with a projecting hub section 31 having a set of annular clutch teeth 32 adapted to engage with the teeth 26 of the drum B.

The rack G is in the form of a bar slidably guided for vertical movement and has a series of teeth 33 thereon, engageable with the teeth of the worm wheel D. To guide the rack bar G, the back wall 14 of the housing is provided with a vertical rib 34 engaging one side of the bar, the other side of the bar being provided with a flange bearing on a right angular extension on the wall 14 and being overhung by a vertical rib 36 on said extension. The rib 34 has an outwardly enlarged portion 134, which cooperates with the inner side of the worm wheel D to prevent inner movement thereof lengthwise on the tubular shaft C. Below the rack teeth 33, the rack bar G is cut away, as indicated at 37, to clear the teeth of the worm wheel, as shown in Figures 2 and 5. Near the upper end, the rack bar G is provided with a vertical slot or opening 38 therethrough for a purpose hereinafter pointed out.

The shipper member F is swingingly supported on a shaft 39 mounted in lugs projecting from the partition wall 21, one only of said lugs being shown in the drawings, the same being indicated by 40. The shipper member has the usual spaced arms, forming a fork member embracing the grooved enlargement 24 of the drum B. The arms of the fork are provided with the usual trunnions engaging within the groove 25 of said enlargement. One of said arms and trunnions only are shown in the drawings, the same being indicated respectively by 41 and 42. The shipper member F is also provided with a laterally extending arm 43 engaged in the slot 38 of the rack bar G. An upwardly bowed leaf spring 44 extends into the lower end of the slot 38 and cooperates with the arm 43 to yieldingly support the same, the spring being fixed to the rack bar by means of a screw 45 extending through the downwardly bent end portion of the spring. As will be evident, when the rack is raised or lowered, the shipper F will be rocked to shift the drum to either engage the teeth thereof with the teeth of the worm gear wheel D or disengage said teeth therefrom.

The operation of my improved hand brake mechanism in applying the brakes is as follows: The hand wheel is rotated to actuate the worm element E, thereby rotating the worm wheel D in a clockwise direction, as viewed in Figure 2. Inasmuch as the clutch teeth of the chain winding drum B are at this time engaged with the clutch teeth of the worm wheel D, the drum will be rotated to wind the chain thereon and tighten the brakes. During this operation there will be no movement of the rack G to actuate the clutch means, the lower teeth of the rack ratcheting over the teeth of the worm wheel D while the latter is rotated in said right hand direction.

In releasing the brakes, the hand wheel is rotated in a reverse direction to that hereinbefore referred to, thereby rotating the worm wheel D in a left hand direction, as viewed in Figure 2, while actuating the chain winding drum B. During rotation of the worm wheel D in said left hand direction, the teeth thereof will engage with the teeth of the rack G, thereby causing the rack to slide downwardly from the position shown in Figures 1 and 2 to the position shown in Figures 4 and 5. During the first part of the downward movement of the rack G, the clutch means will not be actuated because, as clearly shown in Figures 1, 2, 4, and 5, there is sufficient play of the arm 43 of the shipper F in the slot 38 of the rack G to permit of a certain amount of relative movement between the rack and the arm 43 before the upper wall of the slot will engage said arm. As will be evident, this delayed action of the clutch shifting means permits of a certain amount of backing off of the brakes before the clutch means is actuated. Due to this backing off of the brakes, the pressure on the clutch teeth is relieved and the disengagement of the teeth from each other thus greatly facilitated. After the lost motion has been taken up between the rack bar G and the arm 43 of the shipper F, the shipper will be swung from the position shown in Figure 1 to that shown in Figure 4, thereby sliding the chain winding drum B to the right, as viewed in said figures, and completely disengaging the clutch teeth 26 of the drum from the clutch teeth 32 of the worm wheel D. When the clutch mechanism has thus been completely released, the chain winding drum is free to rotate to permit complete unwinding of the chain therefrom. The brakeman is thus protected from injury as there is no spinning of the hand wheel during the free rotation of the drum. In again applying the brakes, rotation of the hand wheel in chain tightening direction will effect rotation of the worm wheel D in a clockwise, or right hand direction, as viewed in Figures 2 and 5, thereby raising the rack from the position shown in Figure 5 to that shown in Figure 2 and swinging the shipper from the position shown in Figure 4 to that shown in Figure 1, thereby reengaging the clutch teeth of the chain winding drum B with the clutch teeth of the worm wheel D and causing the drum to rotate in unison with said worm wheel during further operation of the mechanism. Further rotation of the hand wheel effects complete tightening of the brakes, as hereinbefore pointed out. Proper engagement of the cooperating teeth of the chain winding drum and hub of the worm wheel D is assured by the yielding support provided for the arm 43 of the shipper F by the spring 44, said spring in its yielding action permitting delayed action of the shipper F so that the teeth of the drum B may be properly matched up with the teeth on the worm wheel D.

I have herein shown and described what I now consider the preferred manner of carrying out my invention, but the same is merely illustrative and I contemplate all changes and modifications that come within the scope of the claims appended hereto.

I claim:

1. In a hand brake mechanism, the combination with a rotary chain winding drum member; of a rotary gear member coaxial with said winding member, said members having interengaging clutch teeth thereon, and one of said members being slidable toward and away from the other; means for rotating said gear member; and means actuated through rotation of said gear member, for bodily sliding one of said members axially toward and away from the other to either bring said clutch teeth into engagement or disengage the same.

2. In a hand brake mechanism, the combination with a rotary winding member; of a rotary gear; means for rotating said gear; clutch means operatively connecting the winding member and gear; a sliding rack bar engageable with said gear; and means operatively connecting said rack bar and clutch means for actuating the latter.

3. In a hand brake mechanism, the combination with a rotary winding member; of a rotary gear member; means for rotating said gear member; clutch means operatively connecting the winding and gear members; and means for actuating said clutch means, including a reciprocable bar having rack teeth thereon engageable by the teeth of said gear member.

4. In a hand brake mechanism, the combination with a rotary chain winding member; of a rotary gear; a sliding rack adapted to be engaged by the teeth of the gear; clutch means operatively connecting said gear and winding member; and shipper means operatively connected to the rack for actuating the clutch means.

5. In a hand brake mechanism, the combination with a rotary chain winding member; of a rotary gear member; means for rotating said gear member; a reciprocable rack engageable by the teeth of said gear member; clutch means operatively connecting said winding member and gear; and means for actuating said clutch means, including a shipper having a lost motion connection with said rack.

6. In a hand brake mechanism, the combination with a rotary chain winding member; of a rotary gear member; a reciprocable rack bar having teeth engageable with the teeth of said gear member; clutch means operatively connecting said winding member and gear; and means for actuating said clutch means, comprising a shipper having a yielding connection with said rack bar.

7. In a hand brake mechanism, the combination with a rotary chain winding member; of a rotary gear member; means for rotating said gear member; clutch means for connecting said winding and gear members; a reciprocable rack bar having rack teeth adapted to be engaged by the teeth of the gear member, said rack bar having a slot therein; and a rocking clutch shifting member, said rocking member having an actuating arm thereon engaged within the slot of the rack bar and having lost motion in said slot.

8. In a hand brake mechanism, the combination with a rotary chain winding member; of a rotary gear member; means for rotating said gear member; clutch means for operatively connecting said members; a reciprocable rack bar having teeth adapted to be engaged by the teeth of the gear member, said rack bar having an opening therethrough; a rocking clutch shifting member having an arm extending into said slot of the rack bar, said arm having lost motion in said opening; and yielding means reacting between said rack bar and arm of the shifting member.

9. In a hand brake mechanism, the combination with a rotary chain winding member; of a worm wheel; a worm for rotating said worm wheel; clutch means operatively connecting said winding member and worm wheel; a reciprocable rack bar having teeth adapted to be engaged by the teeth of the worm wheel; and a rocking clutch shifting member actuated by said rack member.

10. In a hand brake mechanism, the combination with a rotary chain winding member mounted for rotation about a horizontal axis; of a worm wheel coaxial with said member; a vertically slidable rack member having a rack section normally resting on the teeth of said worm wheel and ratcheting thereover when the worm wheel is rotated in chain winding direction, and being engaged by the teeth of said worm wheel when the latter is rotated in brake releasing direction to effect reciprocation of said rack member; clutch means connecting said worm wheel and winding member; and a shipper member actuated by said rack member for operating said clutch means.

ROLAND J. OLANDER.